United States Patent
Sandau et al.

(10) Patent No.: US 6,433,815 B1
(45) Date of Patent: Aug. 13, 2002

(54) METHOD AND DEVICE FOR IMAGING WITH HIGH GEOMETRICAL RESOLUTION ON A MICROSATELLITE

(75) Inventors: Rainer Sandau, Stolzenhagen; Klaus Briess, Berlin; Martin Scheele, Brieselang; Ingo Walter, Berlin, all of (DE)

(73) Assignee: Deutsches Zentrum für Luft-und Raumfahrt e. V., Bonn (DE)

( * ) Notice: Subject to any disclaimer, the term of this patent is extended or adjusted under 35 U.S.C. 154(b) by 0 days.

(21) Appl. No.: 09/340,838

(22) Filed: Jun. 28, 1999

(30) Foreign Application Priority Data

Jun. 26, 1998 (DE) .......................................... 198 30 036

(51) Int. Cl.$^7$ ................................................ H04N 7/18
(52) U.S. Cl. ........................ 348/145; 348/147; 348/295
(58) Field of Search ................................ 348/144, 145, 348/146, 147, 295; H04N 7/18

(56) References Cited

U.S. PATENT DOCUMENTS 5,835,137 A * 11/1998 McKeown .................. 348/144

6,256,057 B1 * 7/2001 Mathews et al. .......... 348/144

FOREIGN PATENT DOCUMENTS

| DE | 1 772 429 | 3/1971 |
| DE | 2 251 913 | 5/1973 |
| DE | 195 02 045 | 7/1996 |
| GB | 2 272 778 | 5/1994 |

OTHER PUBLICATIONS

Article entitled "SN Improvement Ratio By Time Delay And Integration For High–Resolution Earth Observation System" by Riichi Nagura, published in Electronics and Communications in Japan, Part 1, vol. 78, dated 1995, pp. 74–83.

* cited by examiner

Primary Examiner—Howard Britton
(74) Attorney, Agent, or Firm—Cohen, Pontani Lieberman & Pavane

(57) ABSTRACT

A method and a device for imaging with high geometrical resolution on a microsatellite. The device includes an objective and a focal plane on which an extended optical detector is fitted. The objective and the focal plane being fastened rigidly to the microsatellite. Intermediate optics, which can be moved using a setting and resetting instrument, are arranged between the objective and the focal plane.

11 Claims, 1 Drawing Sheet

METHOD AND DEVICE FOR IMAGING WITH HIGH GEOMETRICAL RESOLUTION ON A MICROSATELLITE

BACKGROUND OF THE INVENTION

1. Field of the Invention

The invention relates to a method and to a device for imaging with high geometrical resolution on a microsatellite.

2. Discussion of the Prior Art

In order to obtain high geometrical resolution simultaneously with a large capture angle, linear CCD array sensors are used in the camera systems for satellite applications. Together with the increase in the geometrical resolution for a given orbital altitude, it is necessary to accept the reduction in the energy incident on a picture element. When increasing the focal length of the camera and at the same time reducing the field of view of the pixels, there are two possible solutions in order to compensate for the reduced input energy on the detector:

1. Increasing the aperture of the objective
2. Lengthening the integration time.

The linear increase in the objective diameter, which is needed when increasing the focal length, is accompanied by a cubic increase in mass and volume of the objective. The reduction in the integration time when reducing the ground pixel size results in a further increase of the objective diameter. This first possible solution is inappropriate for microsatellite application since these must have only a very small mass.

The integration time tint is chosen, in linear CCD array cameras working in push-broom mode, to be less than or at most equal to the time $t_{dwell}$ which is needed for shifting the projection of a CCD picture element onto the surface of the earth by one pixel dimension $t_{int} \leq t_{dwell}$, i.e. ground pixel blur$\leq 1$ pixel. If the radiation energy reaching the CCD element for a given objective/filter arrangement is not enough to obtain a particular signal/noise ratio, then the ground track projection of the linear CCD arrays needs to be increased in the direction of motion by adding other linear CCD arrays arranged in parallel with the first linear CCD array. The signal/noise ratio can, with a fixed satellite platform/objective/focal plane arrangement, be increased using the TDI principle (Time Delay and Integration; Riichi Nagura: SN Improvement Ratio by Time Delay and Integration for High-Resolution Earth Observatorium System. Electronics and Communication in Japan, Part 1, Vol. 78, 1995, No. 3, pp 74–84). In the TDI principle, with n linear CCD arrays, the satellite movement and the blurring of the ground trace which this causes are compensated for by n-tuple sampling of a linear array projection onto the surface of the earth and subsequent accumulation of the n linear array information items in each case shifted by one $t_{dwell}$. To obtain this effect, the n-tuple data rates of the detector arrangement need to be processed and compressed. The outlay needed for this with the electronic circuits and the electrical energy needed prohibit applications on microsatellites.

German reference DE 195 02 045 discloses a device for imaging with high geometrical resolution on satellites. In this device the camera platform is tracked using a tracking system counter to the velocity vector of the satellite or the focal plane using piezoelectric actuators, in such a way as to compensate for the blurring effect of the satellite movement over the n-tuple time $t_{dwell}$. The mechanical impulses generated by the movement of the masses, that is to say the platform and the camera or the focal plane with the electronic components for CCD drive and read-out, the components for thermal stabilization, as well as the cabling needed for this, are not negligible in the case of the small mass inherent in the microsatellite and make it difficult to obtain a high geometrical resolution. Thus, it is not possible to resort to such compensating measures for applications on a microsatellite.

SUMMARY OF THE INVENTION

The object of the invention is therefore to provide a method and device for imaging with high geometrical resolution on a microsatellite.

Pursuant to this object, and others which will become apparent hereafter, one aspect of the present invention resides in a device for imaging with high geometrical resolution on a microsatellite, which device comprises an objective, a focal plane, an extended optical detector fitted on the focal plane, and moveable intermediate optics arranged between the objective and the focal plane. The objective and the focal plane are fastened rigidly to the microsatellite. By virtue of the rigid arrangement of the objective and the focal plane, between which intermediate optics that can be moved using a setting and resetting device are arranged, bathe energetic action time on the optical detector for each picture element is lengthened. The picture elements are sampled once after complete tracking. Because of the low mass of the intermediate optics in relation to the objective and the focal plane, the mechanical pulses which are generated are negligible, while, because of the single sampling, the outlay for the data processing is not increased, unlike with the TDI method.

In another embodiment of the invention, the intermediate optics comprise a beam deflecting instrument, so that the focal plane can be arranged substantially independently of the objective. This makes it possible for the microsatellite to have a compact structure. The beam deflecting device may, for example, consist of optical fibers or prisms, although it is preferably formed by at least one mirror.

In a further embodiment, the intermediate optics comprise an optical field adapter which is arranged between the beam deflecting instrument and the focal plane and is designed, for example, as a converging lens. In order to produce the tracking movement, either the mirror arrangement or the field adapter are then designed to be mobile, in order to balance the microsatellite's own movement.

The extended optical detector is, for example, designed as a CCD matrix. However, since CCD matrices are very expensive, the extended optical detector is preferably formed by n linear CCD arrays arranged without gaps between them.

The setting and resetting instrument is, for example, designed as a piezoelectric actuator or as a stepper motor. A return spring may optionally be allocated to the setting and resulting instrument in order to move the intermediate optics more rapidly back into the starting position. Preferably, however, the intermediate optics are at least partially integrated with the setting and resetting instrument. To that end, the mirror and the setting/resetting instrument are produced using suitable selective etching processes as an integrated rotatable micromirror with allocated actuators. The advantage of these components produced using microsystem technology is their very small volume and low weight.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
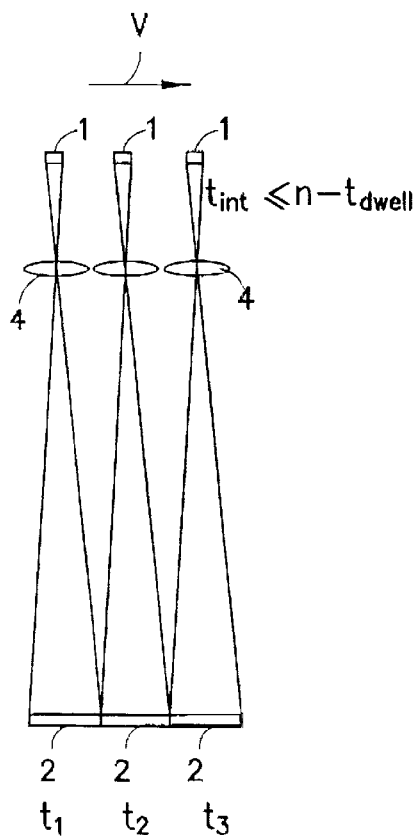
FIG. 1 shows a schematic representation of a recording using the push-broom method (prior art)

FIG. 1 schematically represents the proportions when taking pictures on a satellite or aircraft using the push-broom method. The satellite or the aircraft moves at a velocity v over the observation surface, for example the surface of the earth. In this case, a picture element 1 of the optical detector, which for example is designed as a linear CCD array, sees a particular ground pixel element 2 at time $t_1$. At time $t_2$, with $t_{dwell}=t_3-t_1$, the picture element 1 is shifted by one ground picture element 2. Because of the requirement that the ground pixel blurring must be $\leq 1$ pixel, it is only possible to integrate within the time $t_{int} \leq t_{dwell}$.

Figure 2:
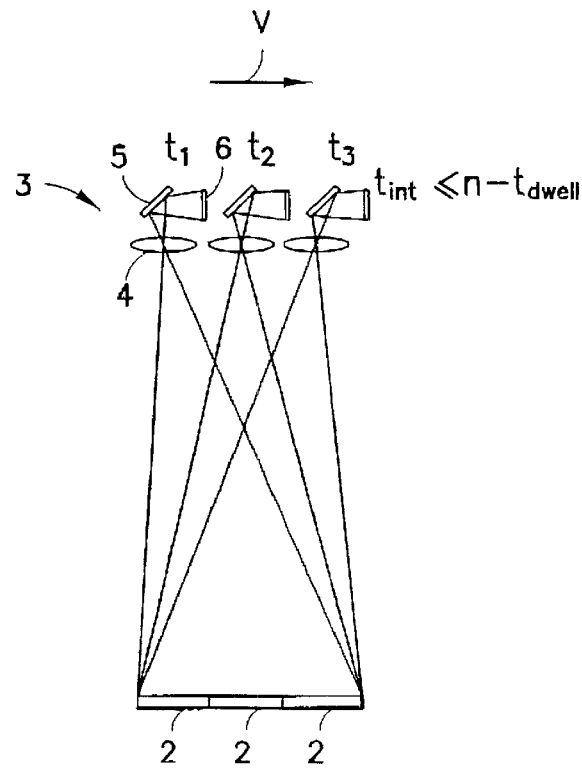
FIG. 2 shows a schematic representation of a recording with an n-tuple energetic action time.

FIG. 2 schematically shows the proportions using the method according to the invention for tripling the integration time $t_{int}$. The device 3 for imaging with high geometrical resolution on a microsatellite comprises an objective 4, an adjustable mirror 5 and an optical detector 6. The optical detector 6 is in this case preferably formed by three linear CCD arrays arranged without gaps between them. At time $t_1$, the mirror 5 is aligned by a setting and resetting instrument (not shown) in such a way that the radiation coming from ground pixels 2 forming a scene is fully projected onto the optical detector 6. At time $t_2$ when the device 3 has moved on by one ground pixel 2, the mirror 5 has been tilted in such a way that the optical detector 6 is again fully illuminated, the tilting movement preferably taking place continuously with the movement of the device 3. At time $t_3$ the device 3 has moved on by another ground pixel and the mirror 5 is again tilted further in such a way that the optical detector 6 is again fully illuminated by the radiation coming from the three ground pixels. The possible integration time $t_{int}$ has thereby been tripled. At the end of time $t_3$, the optical detector 6 is then sampled once and the sensor pixels are read out. Using the resetting instrument, the mirror 5 is then reset to its starting position and the next recording of a directly adjacent scene can be made. n successive linear scene elements of a scene can thus clearly be combined and projected simultaneously onto the focal plane 7. The relative movement of the scene elements because of the microsatellite's own movement is then compensated for by the controlled countermovement of the intermediate optics.

Figure 3:
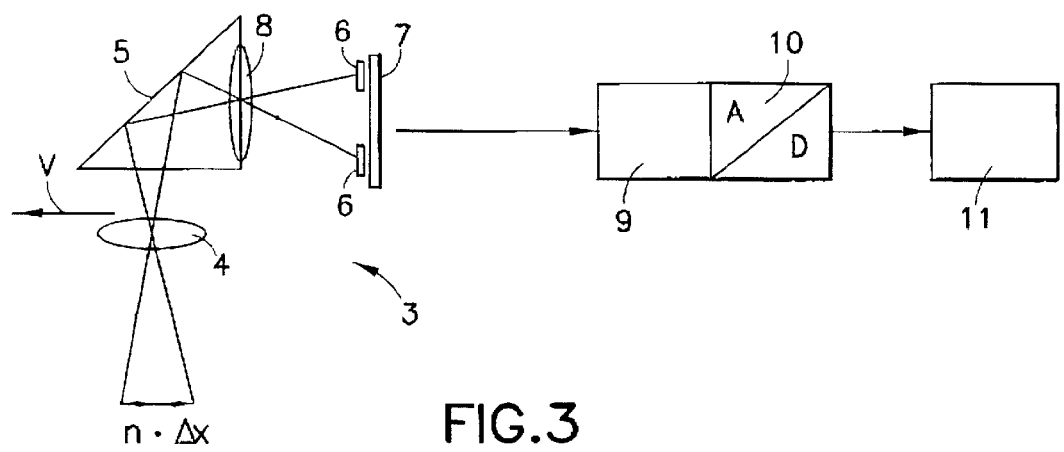
FIG. 3 shows a schematic representation of a device for imaging with high geometrical resolution on a microsatellite.

FIG. 3 represents another embodiment of the device 3. Arranged on the focal plane 7 is the optical detector 6, which is formed by n linear CCD arrays arranged next to one another without gaps, only the outer two of which have been represented for the sake of clarity. Between the mirror 5 and the focal plane 7, a field adapter 8 designed as a converging lens is arranged, which is designed to be displaceable perpendicular to the optical axis. Using front-end electronics 9, the optical detector 6 is then read out after the recording of a scene has been completed, and digitizing is carried out using an A/D converter 10 connected downstream of the front end electronics 9. The digitized picture data are then stored in a bulk storage memory 11 and, where appropriate, transmitted to a ground station. Because the energy on the optical detector 6 is inversely proportional to the square of the aperture ratio focal length/objective diameter, the objective diameter can be reduced by at most the square root of n.

The numerical example below will explain the invention further:

Satellite altitude H=500 km
Sampling interval of the CCD elements $\delta=7$ $\mu$m
Focal length f=1 m When using optics limited by diffraction, the following is approximately found from sampling theory $$\delta_{max} \leq f/D 19 \, \lambda/2.$$

For the sampling interval $\delta=7$ $\mu$m, with a focal width f=1 m the diameter of the objective aperture needs to be chosen at D=36 mm.

The ground pixel size X has, with this configuration, the value X=3.5 m and the time $t_{dwell}=0.5$ ms.

If, in order to operate a specific CCD in a amera in the panchromatic range, e.g., $\lambda=0.5$ $\mu$m ... 0.75 $\mu$m an aperture ratio F/D=4 is needed (corresponding to D=250 mm), then from D=36 mm, f=1 m, f/D$\approx$28 and with the signal s$\sim$(D/f)$^2$ an approximate integration time lengthening of 50 would result. It would then be necessary to arrange n=50 linear CCD arrays in parallel in the focal plane.

The A/D converter would need to be configured with k=12,000 detector elements per linear CCD array for a sampling rate of $DR_{CCD}=DR_{ADC}=K/t_{dwell}=24$ MSamples/s.

The camera system would correspondingly fill the mass storage memory with 24 MPixel/s. With an 8-bit word length, a 12,000×12,000 pixel square picture would give a data volume of 144 MBytes=1.2 GBit, which is generated in a time $t_{square}=6$ s.

The invention is not limited by the embodiments described above which are presented as examples only but can be modified in various ways within the scope of protection defined by the appended patent claims.

We claim:

1. A device for imaging with high geometrical resolution on a microsatellite, comprising:
   an objective;
   a focal plane;
   an extended optical detector fitted on the focal plane, the objective and the focal plane being rigidly fastenable to the microsatellite; and
   movable intermediate optics arranged between the objective and the focal plane.

2. A device as defined in claim 1, and further comprising a setting and resetting instrument operatively connected to the intermediate optics for moving the intermediate optics.

3. A device as defined in claim 2, wherein the intermediate optics comprise a beam deflecting instrument.

4. A device as defined in claim 3, wherein the beam deflecting instrument includes at least one mirror arrangement.

5. A device as defined in claim 4, wherein the intermediate optics further comprise an optical field adapter arranged between the mirror arrangement and the focal plane.

6. A device as defined in claim 5, wherein at least one of the mirror arrangement and the optical field adapter is movable by the setting and resetting instrument, the optical field adapter being movable perpendicular to the optical axis of the focal plane.

7. A device as defined in claim 1, wherein the extended optical detector includes a number of linear CCD arrays arranged without gaps between them on the focal plane.

8. A device as defined in claim 2, wherein the setting and resetting instrument is a piezoelectric actuator.

9. A device as defined in claim 2, wherein the setting and resetting instrument is a stepper motor.

10. A device as defined in claim 4, wherein the mirror arrangement is an integrated micromirror with an integrated setting and resetting instrument.

11. A method for imaging with high geometrical resolution on a microsatellite with a device including an objective, a focal plane, an extended optical detector fitted on the focal plane, the objective and the focal plane being fastened rigidly to the microsatellite, movable intermediate optics arranged between the objective and the focal plane, and a setting and resetting instrument operatively connected to the intermediate optics for moving the intermediate optics, the method comprising the steps of:

periodically operating the setting and resetting instrument; and tracking the intermediate optics which are in active connection with the setting and resetting instrument so that radiation coming from a surface to be recorded always fully illuminates the optical detector so that the energetic action period on the optical detector is lengthened and the optical detector is easily read and sampled after resetting the intermediate optics.

* * * * *